United States Patent [19]
Fischl et al.

[11] Patent Number: 5,293,109
[45] Date of Patent: Mar. 8, 1994

[54] EARLY RECOGNITION BATTERY DISCONNECT

[75] Inventors: Steven R. Fischl; Russell E. Gyenes, both of Sunrise, Fla.; Harold Gorenz, Lisle, Ill.

[73] Assignee: Motorola, Inc., Schaumburg, Ill.

[21] Appl. No.: 952,090

[22] Filed: Sep. 28, 1992

[51] Int. Cl.$^5$ .......................... H02J 7/00; H01M 2/10
[52] U.S. Cl. .......................................... 320/2; 429/97
[58] Field of Search ..................... 320/2; 429/1, 9, 10, 429/96, 97, 98, 99, 100

[56] References Cited

U.S. PATENT DOCUMENTS

| | | | |
|---|---|---|---|
| 3,659,180 | 4/1972 | Urbush | 320/2 |
| 3,728,664 | 4/1973 | Hurst | 320/2 |
| 4,758,628 | 3/1986 | Siwiak | 320/2 |
| 4,871,629 | 10/1989 | Bunyea | 429/97 |
| 4,943,498 | 7/1990 | Cooper et al. | 429/100 X |
| 5,122,927 | 6/1992 | Satou | 429/99 X |
| 5,193,220 | 3/1993 | Inchinohe et al. | 429/1 X |
| 5,200,686 | 4/1993 | Lee | 320/2 |

Primary Examiner—Kristine L. Peckman
Attorney, Agent, or Firm—Leslie A. Rhyne; Pablo Meles

[57] ABSTRACT

A battery pack (12) for connection to an electronic product (10) having mating contacts (22, 24, 26, & 28) comprises a housing (11), an energy storage device (15) located within the housing for storing a charge, a first contact (38) and a second contact (36) coupled to the energy storage device and exposed externally from the housing. Circuitry couples to the energy storage device and provides at least the interconnection between the first and second contact and the energy storage device. Additionally, there is at least a third contact (34) exposed externally from the housing and coupled to at least one electronic device (42) within the housing. Finally, the battery pack has a connecting scheme for connecting the first and second contact of the battery pack to the product before the connection of the third contact to the mating contact on the electronic product.

20 Claims, 2 Drawing Sheets

EARLY RECOGNITION BATTERY DISCONNECT

TECHNICAL FIELD

This invention relates generally to electrical contact disconnecting schemes in general and particularly to an early recognition scheme for recognizing a disconnecting battery.

BACKGROUND

Typical battery pack connection schemes provide for the simultaneous mechanical connection between the battery pack contacts (including positive and negative battery contacts and other contacts providing signals) and the corresponding mating contacts on an electronic product such as a charger or a portable radio or computer. Today, with more products using microprocessors and other sophisticated integrated circuits such as digital signaling processors and multimedia chips, a "harsh" shutdown of these circuits by the sudden disconnection of a battery pack from a product without an appropriate shutdown of such circuits could wreak more havoc than in the past. These "harsh" product shutdowns not only degrade the reliability of the products, but in many instances, settings or information that may have been existing in RAM or other volatile memory could be lost without retrieval.

Presently, battery pack to product interconnect schemes only have single stage mechanical latches that cannot prevent a "harsh" product shut down. Likewise, many battery packs may power up their interconnected product when first connected even though the battery pack may not be appropriate for the interconnected product. Thus, a battery disconnecting scheme is desired that allows for the early recognition of a battery being disconnected from a product to allow for an appropriate product shutdown. Additionally, a battery connect scheme is desired that allows for the recognition of the appropriate battery being connected to the product.

SUMMARY OF THE INVENTION

A battery pack for connection to an electronic product having mating contacts comprises a housing, an energy storage device located within the housing for storing a charge, a first contact and a second contact coupled to the energy storage device and exposed externally from the housing. Circuitry couples to the energy storage device and provides at least the interconnection between the first and second contact and the energy storage device. Additionally, there is at least a third contact exposed externally from the housing and coupled to at least one electronic device within the housing. Finally, the battery pack has a connecting scheme for connecting the first and second contact of the battery pack to the product before or after the connection of the third contact to the mating contact on the electronic product.

DETAILED DESCRIPTION OF THE PREFERRED EMBODIMENT

Figure 1:
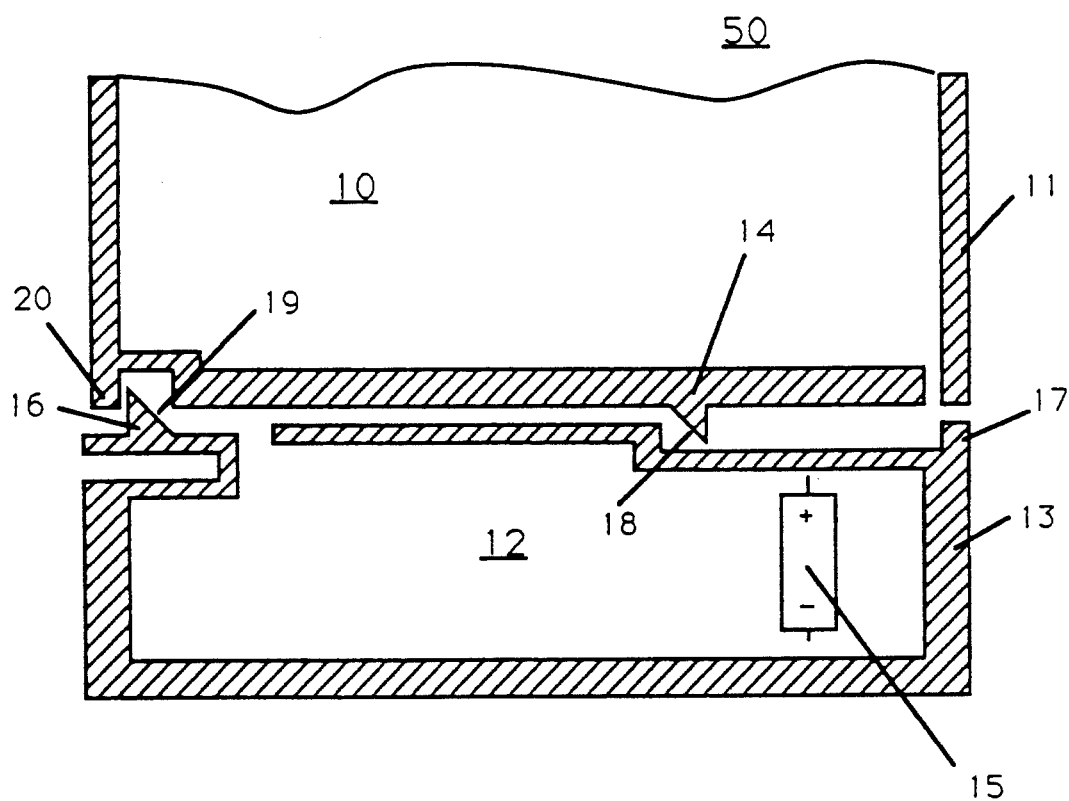
FIG. 1 is a side view of a battery pack and an electronic product having a dual latch in accordance with the present invention.

Referring to FIG. 1, there is shown a side view of a battery pack 12 and an electronic product 10 having a mechanical dual latch (14 and 16) that could be used in accordance with the present invention. The pack 12 and product 10 preferably comprises a system for recognizing either the electrical disconnection or connection of the pack to or from the electronic product. The battery pack 12 comprises a housing 13 having an energy storage means 15 located within the housing. The energy storage means preferably comprises rechargeable cells such as nickel cadmium, lead acid, nickel metal hydride, lithium ion, zinc air or any other suitable cell. The present invention is also suitable with primary non-rechargeable cells such as alkaline cells.

In operation, although the mechanical dual stage latch is optional to practice the invention, the dual latch could assist in providing greater time for the attached electronic product to either power up or power down as necessary. The benefit of such a latch will become more apparent later with the discussion of FIGS. 2 and 3. This dual stage latch could easily be adaptable to the typical slide-on single latch mechanisms that are common in the art of portable two-way radio battery packs. To remove the battery 12 from the electronic product 10, the user would activate the first latch 16 by pressing down and allowing the user to slide the battery 12 toward the left along a rail (not shown) for a predetermined distance until the mechanical stop 17 of the battery hits the second latch 14. Then, the user can push up the second latch 14, allowing the removal of the remainder of the battery by sliding it further to the left. To reconnect the battery once again to the electronic product 10, the battery is slid to the right forcing the latch 14 to move up as the mechanical stop 17 slides down the ramp feature 18 on the latch 14. Likewise, the latch 16 will move down as the battery 12 is forced further to the right and the left bottom portion 20 of the electronic product's housing slides up the ramp 19 of the latch 16 until battery locks in place as shown.

Figure 2:
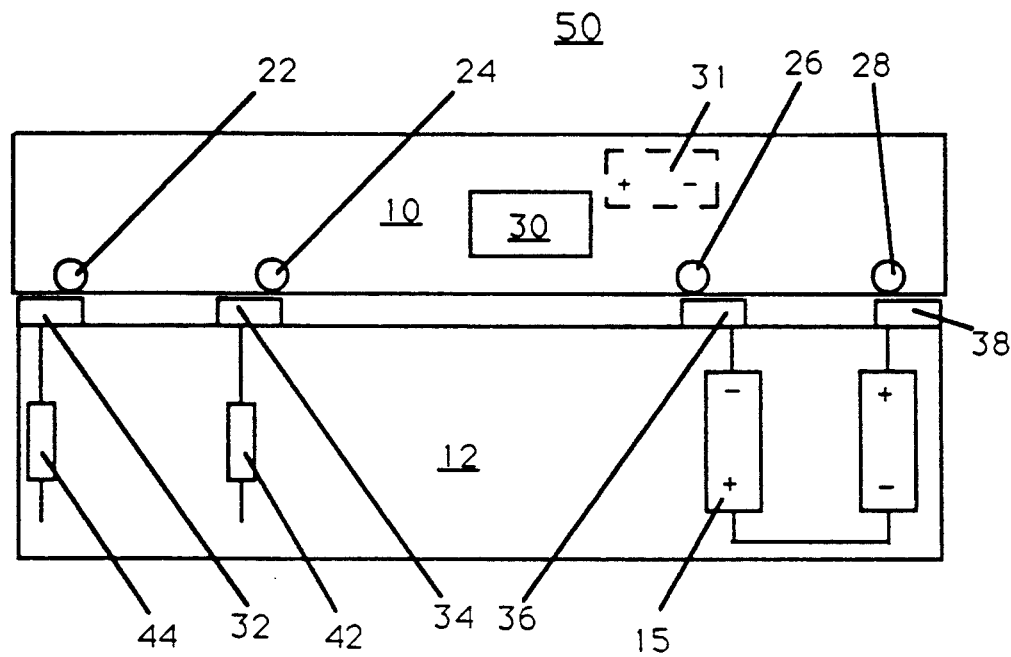
FIG. 2 is a side view of a battery pack and an electronic product wherein their mating contacts are engaged in accordance with the present invention.
Figure 3:
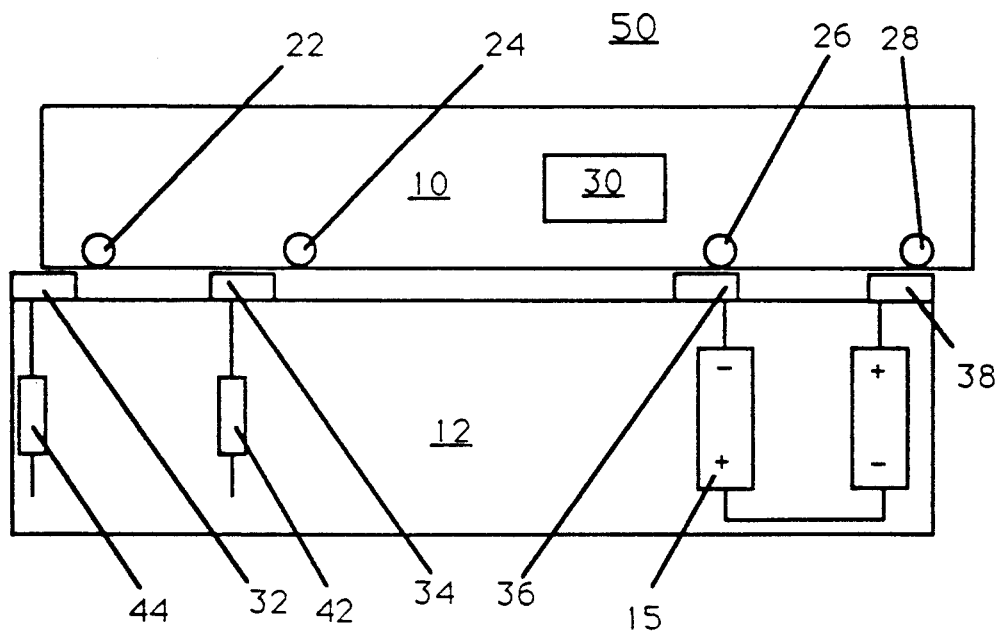
FIG. 3 is a side view of a battery pack and an electronic product wherein their mating contacts are disengaged in accordance with the present invention.

Referring to FIGS. 2 and 3, there is shown a battery pack connection or disconnection system 50 comprising a battery 12 and an electronic product 10 such as a radio, pager, charger, computer, or any myriad of electronic products that typically have processing means 30 such as a microprocessor or microcontroller. The processing means 30 is preferably any circuit that could recognize that a power source is either about to be disconnected or connected to the electronic product 10 before either powering down or powering up respectively the electronic product 10.

The battery pack 12 preferably comprises a conventional battery pack having cells 15 within a housing 11 (shown in FIG. 1) and having a first contact 38 and a second contact 36 coupled to the cells. The first and second contacts (38 and 36) are exposed externally from the housing to allow connection to mating contacts (28 & 26) of the electronic product 10. The first and second contacts 38 and 36 preferably provide the power to operate the product 10. The battery 12 also preferably comprises a resistor 42 such as a code resistor and a device 44 such as a thermistor 44. Alternatively, the device 42 could be a memory device. Preferably, the resistor 42 is coupled to a third contact 34 that is exposed externally from the housing. Likewise, the thermistor 44 is coupled to a fourth contact 32 that is also exposed externally from the housing. Circuitry means provides the interconnection between the cells and the contacts and the resistor 42 and thermistor 44 and the contact of the battery. The circuitry means could be steel straps, flex circuitry, or other means known in the art.

The electronic product 10 is preferably a portable product such as a two-way radio having a first mating contact 28, a second mating contact 26, a third mating contact 24 and a fourth mating contact 22 for coupling with contacts 38, 36, 34, and 32 respectively. Again, the electronic product preferably further comprises a microprocessor 30 that could determine when the power is about to be connected or disconnected before actually powering up or powering down respectively the product 10.

Referring to FIG. 2, the battery 12 is engaged with the product 10. All four contacts of the battery (32, 34, 36, & 38) are coupled to all four mating contacts of the electronic product (22, 24, 26, & 28 respectively.) Operationally, as the battery 12 is being disengaged from the product 10 as shown in FIG. 3, the power contacts, first and second contacts (38 & 36) remain in contact with the electronic product 10, while the third contact 34 and the fourth contact 32 uncouple from the respective mating contacts (24 & 22) on the product 10 due to the offset alignment of the contacts. In essence, a means is provided for disconnecting at least the third contact from a mating contact on the electronic product before the disconnection of the first and second contacts. The processing means 30 could immediately recognize the uncoupling of the third contact 34 and/or the fourth contact 32 from their mating contacts on the product and perform a shutdown procedure before the power contacts (38 & 36) are fully disconnected. In other words, it is possible to maintain power to the product 10 while breaking contact with the other contacts, allowing the product the time for an appropriate shutdown. The present invention allows for the sequential connection of power contacts and other contacts rather than the simultaneous connection known in the art.

Likewise, as the battery 12 is mounted or slid onto the product 10, the product 10 could wait to power up until the product recognizes the value of a device (42 or 44). Typically, these devices are resistors and thermistors that provide information to an attached product such as a charger allowing the charger to charge the battery safely and at an optimum charging rate. For instance, if the battery temperature is too hot, it maybe undesirable to charge the battery. In other words, if the thermistor reading indicates a hot battery, the processing means 30 in the attached product could delay the charging until the battery cools down to a desirable operating temperature. Therefore, if the product 10 fails to recognize the attached battery 12 due to the inappropriate values of the device(s) (42 or 44), then the product could prevent the inappropriate charging of the battery. Likewise, the product 10 could prevent the inappropriate battery from providing power to the product 10. The processing means 30 could recognize the existence or values of the devices (42 & 44) and determine if the appropriate battery is attached. In this manner, product safety is insured. For instance, if the voltage or current in a non-recognizeable battery is too high for the applicable use of the product 10, product 10 could electronically prevent itself from ever powering up.

In another example, the battery 12 could be slid onto a product 10 such as a two-way radio. The product 10 could wait to power up completely until the product recognizes the value of a device (42 or 44). In this case, the radio 10 could power up to receive only, and then subsequently allow the transmitter to operate when the microprocessor 30 recognizes the appropriate battery. In some instances, an optional back-up battery 31 such as a low powered button cell may be required in the product 10 for the appropriate function of the connection recognition scheme. Alternatively, if a connection recognition scheme is of prime importance rather than a disconnection recognition scheme, the contacts could be realigned so that the information contacts (32 and 34) coupled to the respective product contacts (22 and 24) before the power contacts (36 & 38 to 26 & 28) couple.

Although several implementations of the present invention were disclosed herein showing the connection or disconnection of power before or after the connection of other contacts, it is within contemplation of the inventors that many other implementations within the spirit of present invention could be formed.

What is claimed is:

1. A battery pack for connection to an electronic product, comprising:
   a housing;
   energy storage means located within the housing for storing a charge;
   a first contact and a second contact coupled to the energy storage means and exposed externally from the housing;
   circuitry means coupled to said energy storage means for providing at least interconnection between the first and the second contact and the energy storage means;
   at least a third contact exposed externally from the housing and coplanarly disposed with the first and the second contact and coupled to at least one electronic device within the housing; and
   means for electronically connecting the first and the second contact of the battery pack to the electronic product after electronically connecting the third contact to the electronic product.

2. The battery pack of claim 1, wherein the battery pack further comprises a dual mechanical latch for preventing the sudden disconnection of the first and the second contact from the electronic product.

3. The battery pack of claim 1, wherein said first contact is a positive battery contact and said second contact is a negative battery contact.

4. The battery pack of claim 1, wherein said energy storage means comprises a plurality of interconnected cells.

5. The battery pack of claim 1, wherein the electronic product includes a back-up battery.

6. The battery pack of claim 1, wherein said third contact is coupled to at least a resistor.

7. The battery pack of claim 1, wherein said third contact is coupled to at least a thermistor.

8. The battery pack of claim 1, wherein said third contact is coupled to at least a memory device.

9. The battery pack of claim 1, wherein said means for connecting comprises having the first and second contacts being offset from the third contact.

10. The battery pack of claim 1, wherein said pack further comprises a fourth contact coupled to a thermistor within the housing, said third contact being coupled to a resistor within the housing.

11. The battery pack of claim 1, wherein the pack further comprises a means for electronically disconnecting the third contact from the electronic product before the first and the second contact of the battery electronically disconnect from the electronic product.

12. A battery pack disconnection system for an electronic product, comprising:
 a first housing for a battery pack comprising:
  energy storage means located within the housing for storing a charge;
  a first contact and a second contact coupled to the energy storage means and exposed externally from the housing;
  circuitry means coupled to said energy storage means for providing at least interconnection between the first and the second contact and the energy storage means;
  at least a third contact exposed externally from the housing and coupled to at least one electronic device within the housing; and
  means for electronically disconnecting at least the third contact from the electronic product before electronically disconnecting the first contact and the second contact from the electronic product;
 a second housing for the electronic product, comprising:
  at least a first mating contact, a second mating contact, and a third mating contact for electronically connecting with said first contact, said second contact, and said third contact, respectively, of the battery pack;
  a processing means within the electronic product for recognizing the disconnection of the third contact of the battery pack from the third mating contact of the electronic product before the electronic product powers down.

13. The battery pack disconnection system of claim 11, wherein the processing means further recognizes the connection of the first and the second contact of the battery pack to the first mating contact and the second mating contact of the electronic product before the electronic product powers up.

14. The system of claim 12, wherein the electronic product comprises a radio.

15. The system of claim 13, wherein the electronic product comprises a radio.

16. The system of claim 12, wherein the electronic product comprises a computer.

17. The system of claim 13, wherein the electronic product comprises a computer.

18. The system of claim 12, wherein the electronic product comprises a charger.

19. The system of claim 13, wherein the electronic product comprises a charger.

20. The system of claim 12, wherein the processing means comprises a microprocessor.

* * * * *